United States Patent [19]

Kamiya et al.

[11] Patent Number: 4,832,721
[45] Date of Patent: May 23, 1989

[54] METHOD OF FABRICATING OPTICAL FIBER BASE MATERIAL

[75] Inventors: Tamotsu Kamiya; Nobuhito Uchiyama; Yasuhiro Shibayama, all of Ichihara, Japan

[73] Assignee: Furukawa Electric Co., Ltd., Tokyo, Japan

[21] Appl. No.: 760,642

[22] Filed: Jul. 30, 1985

[30] Foreign Application Priority Data

Jul. 31, 1984 [JP] Japan ............................... 59-162400

[51] Int. Cl.$^4$ .......................................... C03B 37/018
[52] U.S. Cl. ...................................... 65/3.12; 65/18.2
[58] Field of Search ..................... 65/3.12, 3.2, 18.2, 65/144, 29

[56] References Cited

U.S. PATENT DOCUMENTS

| | | | |
|---|---|---|---|
| 4,280,829 | 7/1981 | Sheth | 65/3.12 |
| 4,304,581 | 12/1981 | Saifi | 65/3.12 |
| 4,453,961 | 6/1984 | Berkey | 65/3.12 |
| 4,504,299 | 3/1985 | MacChesney et al. | 65/3.12 |
| 4,632,684 | 12/1986 | Karbassivoon et al. | 65/3.12 |
| 4,636,235 | 1/1987 | Glessner et al. | 65/3.12 |
| 4,636,236 | 1/1987 | Glessner et al. | 65/13 |

FOREIGN PATENT DOCUMENTS 54-14249  2/1979  Japan .................................. 65/3.12

Primary Examiner—Kenneth M. Schor
Attorney, Agent, or Firm—Foley & Lardner, Schwartz, Jeffery, Schwaab, Mack, Blumenthal & Evans

[57] ABSTRACT

A method of fabricating an optical fiber base material which comprises the steps of sequentially accumulating glass made of doped quartz on the inner peripheral surface of a quartz tube to form glass layers, and then forming by heating means the interior of the tube in a solid state, temporarily thermally shrinking the tube when the accumulating step of the glass layers approaches the final period, then again accumulating glass on the inner periphery of the resultant glass layer and then forming the interior of the tube in a solid state. Thus, this method can reduce the center-dip without loss of the controllability of a refractive index distribution.

11 Claims, 2 Drawing Sheets

METHOD OF FABRICATING OPTICAL FIBER BASE MATERIAL

BACKGROUND OF THE INVENTION

This invention relates to a method of fabricating an optical fiber base material by a modified CVD method (MCVD method, modified chemical vapor deposition method).

When an optical fiber base material is fabricated by an MCVD method to provide a graded-index (GI) type quartz optical fiber, the method has the steps of concentrically accumulating synthetic glass on the inner peripheral surface of a quartz tube to form predetermined glass layers, then collapsing the quartz tube to strongly heat and shrink the tube and then filling the tube to form solid state as a rod-shaped base material.

The glass layers accumulated in the quartz tube are made of germanium-doped quartz for a core. When collapsing the quartz tube after accumulating the glass in the above method, Ge content in the inner periphery of the glass layer is evaporated by the strong heating at the collapsing time, and becomes silica-riched, thereby causing the refractive index of the optical fiber base material which is referred to as "center-dip" to become abnormal, i.e., causing the refractive index of the material from being deteriorated in the central portion. Thus, the refractive index of the resulting optical fiber abnormally decreases.

The center-dipped optical fiber thus produced has, as pointed out, a decrease in the baseband characteristic.

In order to eliminate such problems, a glass material and a doped material are supplied in gaseous state into the quartz tube and the tube is strongly heated to sufficiently reduce the diameter in the remaining space in the tube and the tube is then collapsed as disclosed in Japanese Patent Laid-open No. 130131/1983.

According to this conventional method, the dopage of Ge is affected by the temperature and the composition of the core glass. Thus, it is necessary in this method to control the supply of the raw material. In this case, it is not easy to correct the dopage of Ge by applying thermal load to shrink the glass. Therefore, according to this method, it is difficult to provide the base material having small center-dip and a predetermined refractive index distribution.

SUMMARY OF THE INVENTION

Accordingly, an object of this invention is to provide a method of fabricating an optical fiber base material which can eliminate the abovementioned problem and disadvantages and can reduce the center-dip without loss of the controllability of a refractive index distribution.

According to this invention, there is provided a method of fabricating an optical fiber base material which comprises the steps of sequentially accumulating glass made of doped quartz on the inner peripheral surface of a quartz tube to form glass layers, and then forming by heating means the interior of the tube in a solid state, temporarily thermally shrinking the tube when the accumulating step of the glass layers approaches the final period, then again accumulating glass on the inner periphery of the resultant glass layer and then forming the interior of the tube in a solid state.

In the method of this invention as described above, the quartz tube is temporarily shrunk by heating when the accumulating step of the glass layer approaches the final period, glass is again accumulated on the inner periphery of the resultant glass layer, and the interior of the tube is formed in a solid state.

More specifically, the accumulating step of the glass layers and the shrinking step of the glass are executed by dividing into plural times. Accordingly, a thermal load per once at the glass shrinking time is alleviated to suppress the evaporation of the dopant on the inner periphery of the glass layer, with the result that an optical fiber base material having small center dip can be fabricated.

The preceding accumulating step of glass and the shrinking step of glass are performed by the ordinary method, and the heating level may be enhanced only at the collapsing time in the following accumulating step of glass. Therefore, particular difficulty does not exist, and the control of the refractive index distribution is facilitated.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Embodiments of a method of fabricating an optical fiber base material according to the present invention will now be described in detail with reference to the accompanying drawings.

Figure 1:
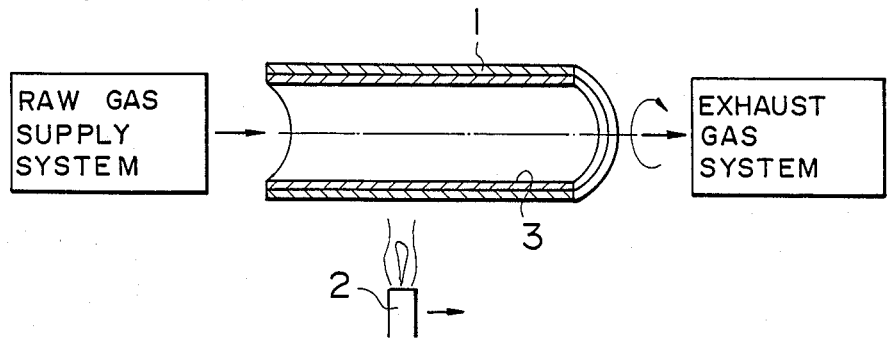
FIGS. 1 to 4 are explanatory views schematically showing an embodiment of the steps of fabricating an optical fiber base material according to this invention.

In FIG. 1, a quartz tube 1 is rotatably set on a glass turntable, not shown, and a raw material gas supplying system is connected to one end of the tube 1, and an exhaust system is connected to the other end of the tube 1.

The tube 1 is rotated in this state, $SiCl_4$, $GeCl_4$ and $O_2$ are supplied into the tube 1 from the raw material gas supplying system, and the interior of the tube 1 is heated by a heater 2 such as an oxyhydrogen flame burner which reciprocates along the axial direction of the tube, and these steps are repeated.

Figure 2:
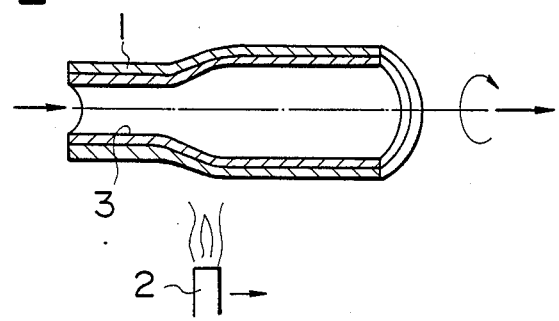

Thus, concentric glass layers 3 are accumulated in the tube 1. When the step of accumulating glass reaches the final period, the raw material is temporarily stopped, only $O_2$ is flowed as a carrier gas into the tube 1, the power of the heater 2 is further increased to thermally shrink the tube 1 as shown in FIG. 2.

In the thermal shrinkage at this time point, space remains in the coaxial center of the tube 1.

Figure 3:
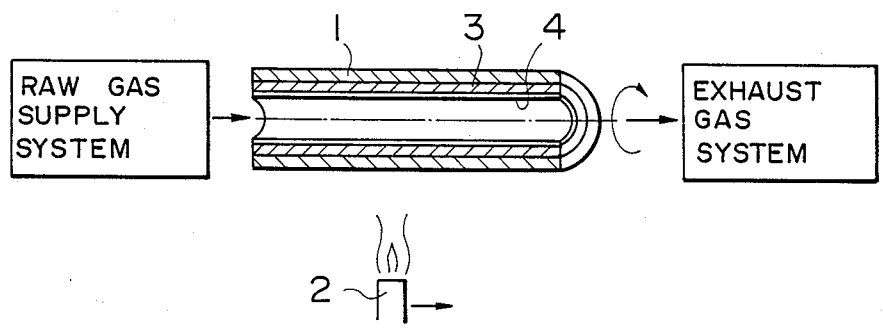

As shown in FIG. 3, the raw material gas is then supplied again from the raw material gas supplying system into the tube 1, the interior of the tube 1 is heated by the heater 2, and glass layers 4 are accumulated.

Figure 4:
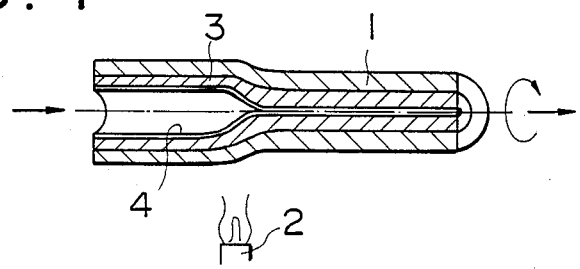

Then, the supply of the raw material is stopped, the power of the heater 2 is increased, and the tube is collapsed as shown in FIG. 4, and the interior of the tube 1 is completely formed in a solid state.

Figure 5:
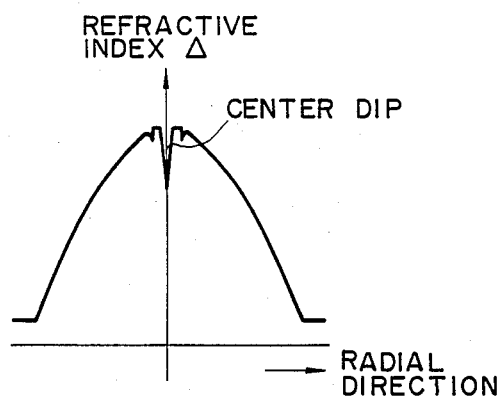
FIG. 5 is a graph illustrating the refractive index distribution of the optical fiber fabricated from the base material fabricated according to the method of this invention.
Figure 6:
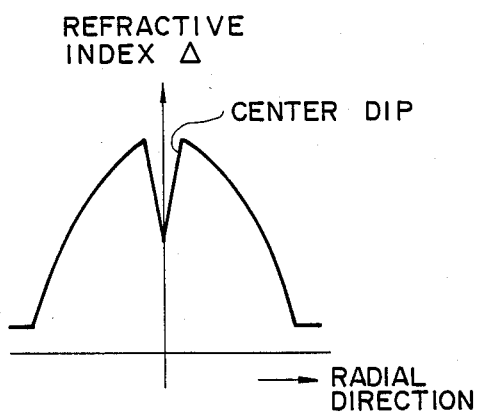
FIG. 6 is a graph illustrating the refractive index distribution of the conventional optical fiber.

FIG. 5 illustrates a graph of the refractive index distribution of the GI type optical fiber obtained by spinning the optical fiber base material fabricated by the method of the present invention, and FIG. 6 illustrates a graph of the refractive index distribution of the conventional GI type optical fiber. As apparent from the comparison of both, the center dip of the optical fiber according to this invention is smaller than that of the conventional one.

Concrete examples of the method according to the present invention will be described.

EXAMPLE 1

In this example, a method of fabricating the base material of a GI type optical fiber will be described.

When a GI type optical fiber base material was fabricated in the steps in FIGS. 1 to 4, a quartz tube 1 having 26 mm of outer diameter and 22 mm of inner diameter was set to a glass turntable, and turned.

In this tube 1, $SiCl_4$, $POCl_3$, $GeCl_4$ and $O_2$ at 25° C. bubbled with $O_2$ from predetermined liquid phase raw material were supplied into the tube 1, and known oxyhydrogen flame burner was used as the heater 2.

The number of accumulating the glass layers at the time of FIG. 1 was forty-nine times, and the raw material supply amount (bubbled amount) and $O_2$ supply amount were set as follows;
  Supply amount of $SiCl_4$: 400 cc/min. from the first layer of the glass layer to forty-ninth layer
  Supply amount of $POCl_3$: 15 cc/min. from the first layer of the glass layer to forty-ninth layer
  Supply amount of $GeCl_4$: 10 cc/min. of the first layer of the glass layer, 490 cc/min. of forty-ninth layer, and 10 cc/min. was increased for each layer during the second layer to forty-ninth layer.
  Supply amount of $O_2$: 1500 cc/min.

The moving speed of the heater 2 along the longitudinal direction of the tube 1 was 230 mm/min.

When the tube 1 was thermally shrunk at the time of FIG. 2, $O_2$ was supplied at 2000 cc/min. into the tube 1, the heating temperature of the heater 2 was 2100° C., and the moving speed of the heater 2 was 80 mm/min.

The number of accumulating the glass layers at the time of FIG. 3 was one. Thus, the glass layers were formed. In this case, the glass layer forming conditions were the same as before, except that the supply amount of $GeCl_4$ was 500 cc/min.

After the respective steps were performed, the interior of the tube 1 was completely formed in a solid state by heating means described with respect to FIG. 4.

The optical fiber base material thus obtained has no center dip as expected. When the band of the GI type optical fiber obtained from the base material were measured by the wavelength of 13 microns, the conventional example was 900 MHz, while the optical fiber of this example 1 was improved to 1300 MHz.

EXAMPLE 2

In this example, a single-mode (SM) type optical fiber base material was fabricated.

When the SM type optical fiber base material was fabricated in the steps from FIG. 1 to FIG. 4, a quartz tube 1 having 26 mm of outer diameter and 22 mm of inner diameter was set to a glass turntable in the same manner as the Example 1, and the tube 1 was turned.

When glass layer for clad was formed in the tube 1 at the time of FIG. 1, $SiCl_4$ of 25° C. of 1000 cc/min. (bubbled amount with $O_2$), $SiCl_4$ of 1000 cc/min. (bubbled amount with $O_2$), and $POCl_3$ of 200 cc/min. (bubbled amount with $O_2$), and $SF_6$ of 5 cc/min. and $O_2$ of 1500 cc/min. were supplied into the tube 1.

The number of accumulating in this case was 40 times.

When glass layers for a core were formed subsequently on the inner surface of the glass layer for clad formed under the above conditions, $SiCl_4$, $GeCl_4$ and $O_2$ bubbled with $O_2$ were supplied into the tube 1, and the glass layer for the core were formed four times of the accumulating number.

In this case, the raw material supplying amounts (bubbled amounts) were as below.
  First layer: $SiCl_4$ = 100 cc/min, $GeCl_4$ = 4 cc/min.
  Second layer: $SiCl_4$ = 100 cc/min, $GeCl_4$ = 9 cc/min.
  Third layer: $SiCl_4$ = 100 cc/min, $GeCl_4$ = 15 cc/min.
  Fourth layer: $SiCl_4$ = 100 cc/min, $GeCl_4$ = 22 cc/min.

When the tube 1 was thermally shrunk at the time of FIG. 2, $O_2$ was supplied into the tube 1 at 2000 cc/min., the heating temperature by heater 2 was 2150° C., and the moving speed of the heater 2 was 80 mm/min.

When the glass layer 4 was formed on the inner surface of the glass layer for the core by one accumulating number at the time of FIG. 3, $SiCl_4$ of 100 cc/min, $GeCl_4$ of 400 cc/min. were supplied into the tube 1, and the glass layers 4 were formed under the same conditions as before.

After the respective steps were performed, the interior of the tube 1 was completely formed in a solid state by the heating means described with respect to FIG. 4.

When the optical fiber base material thus obtained was spun, the SM type optical fiber having no center dip could be obtained.

The SM type optical fiber will be described.

Generally, in case of SM type optical fiber formed of the refractive index profile of triangular shape, low dispersion range is fed to long wavelength side. Accordingly, the optical fiber was considered to be used for 1.55 microns of wavelength range of extremely low loss.

If a dip exists in the center of the optical fiber of SM type in the conventional example, zero dispersion wavelength becomes 1.45 microns. However, when the center dip can be reduced as in the Example 2, the zero dispersion wavelength is shifted to 1.50 microns, and becomes lower dispersion in the 1.55 microns of wavelength range.

Therefore, in case of the method according to the present invention, it is effective in case of controlling the dispersing characteristics of the SM type optical fiber.

According to the method of this invention as discribed above, when the accumulating step of the glass layer approaches the final period, the quartz tube was temporarily shrunk by heating, then glass is again accumulated on the inner periphery of the resultant glass layer, and then the quartz tube is formed in a solid state. Therefore, the base material of the optical fiber having excellent band characteristic can be readily fabricated without loss of the refractive index distribution.

What is claimed is:

1. A method of fabricating an optical fiber preform without center dip, consisting essentially of the steps of:
   (a) sequentially accumulating glass made of doped quartz from a raw material gas comprising reactants for producing said doped quartz glass, said doped quartz glass being accumulated on an inner peripheral surface of a quartz tube to form a plurality of doped quartz glass layers, said inner peripheral surface defining a hollow interior of said quartz tube and said gas being flowed within said tube;

(b) discontinuing said accumulation of said doped quartz glass layers as provided in step (a) by discontinuing flow of the raw material gas within the tube and thereafter shrinking the tube by heating means to reduce the tube diameter and thus to reduce said inner peripheral surface in the absence of said raw material gas;

(c) after step (b), then again accumulating doped quartz glass from a raw material gas on an inner periphery of a radially innermost concentric glass layer formed in step (a); and (d) discontinuing said accumulation of glass layers as provided in step (c) by discontinuing flow of the raw material gas within the tube and thereafter further shrinking the tube to substantially eliminate said hollow interior in the absence of said raw material gas, to thereby provide said preform without center dip.

2. The method according to claim 1, wherein the base material of GI type optical fiber is fabricated.

3. The method according to claim 1, wherein the base material of SM type optical fiber is fabricated.

4. The method according to claim 1, wherein said tube is rotated during said heating steps.

5. The method according to claim 1, wherein said heating steps include passing a heater beneath said tube along a longitudinal direction of said tube.

6. The method according to claim 1, wherein said dopant is GeCl$_4$ or POCl$_3$.

7. A method of fabricating an optical fiber preform without center dip, consisting essentially of the steps of:

(a) providing a quartz tube having a hollow interior and an inner peripheral wall;

(b) feeding a raw material gas containing a dopant into said hollow interior at one end of said quartz tube, and withdrawing the gas at another end of said tube;

(c) heating said tube to a first temperature during said raw material gas feed step, said first temperature being sufficient to effect deposition of raw material gas in the form of a doped quartz glass layer on said inner peripheral wall;

(d) repeating steps (b) and (c) to produce a predetermined number of concentric doped quartz glass layers on each preceding doped glass layer covering said inner peripheral wall to provide less than a desired total number of glass layers in a finished preform;

(e) discontinuing said feeding and then heating said tube to a second temperature sufficient to thermally shrink said tube;

(f) shrinking said tube at said second temperature, such that said hollow interior is reduced in cross section;

(g) repeating steps (b) and (c) to produce additional concentric doped quartz glass layers until the total number of glass layers equals said desired total in said finished preform; and (h) discontinuing the feed of step (g) and heating said tube to a third temperature sufficient to further shrink said tube, such that said hollow interior is substantially eliminated;

wherein said shrinking of step (f) and said further shrinking of step (h) are each effected within a time period less than that required for substantial evaporation of said dopant from a radially innermost concentric glass layer, to thereby provide said preform without center dip.

8. The method according to claim 7, wherein said tube is rotated during said heating steps.

9. The method according to claim 7, wherein said heating steps include passing a heater beneath said tube along a longitudinal direction of said tube.

10. The method according to claim 7, wherein said dopant is GeCl$_4$ or POCl$_3$.

11. A method of fabricating an optical fiber preform without center dip, consisting essentially of the steps of:

(a) sequentially accumulating, at a first temperature, glass made of doped quartz from a raw material gas comprising reactants for producing said doped quartz glass, said doped quartz glass being accumulated on a inner peripheral surface of a quartz tube to form a plurality of doped quartz glass layers, said inner peripheral surface defining a hollow interior of said quartz tube and said gas being flowed within said tube;

(b) discontinuing said accumulation of said doped quartz glass layers as provided in step (a) by replacing said raw material gas in the quartz tube with a carrier gas not having any raw material reactants present and thereafter shrinking the tube by heating at a second temperature to reduce the tube diameter and thus to reduce said inner peripheral surface in the absence of said raw material gas;

(c) after step (b), then again accumulating doped quartz glass at said first temperature from a raw material gas on an inner periphery of a radially innermost concentric glass layer formed in step (a); and (d) discontinuing said accumulation of glass layers as provided in step (c) by replacing said raw material gas in the tube with a carrier gas not having any raw material reactants present and thereafter further shrinking the tube at said second temperature to substantially eliminate said hollow interior in the absence of said raw material gas, to thereby provide said preform without center dip.

* * * * *